(12) United States Patent
Miller et al.

(10) Patent No.: US 6,206,573 B1
(45) Date of Patent: Mar. 27, 2001

(54) HIGH RELIABILITY BEARING STRUCTURE

(75) Inventors: Gayle W. Miller; Gail D. Shelton, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/082,810

(22) Filed: May 21, 1998

(51) Int. Cl.[7] .................................................. F16C 19/52
(52) U.S. Cl. .................................... 384/448; 384/624
(58) Field of Search ................................ 384/624, 448, 384/446, 277, 282

(56) References Cited

U.S. PATENT DOCUMENTS

| | | | |
|---|---|---|---|
| 3,797,896 | * | 3/1974 | Bardach . |
| 4,014,540 | * | 3/1977 | Caulkins . |
| 4,493,042 | * | 1/1985 | Shima et al. ........................ 364/507 |
| 5,001,933 | * | 3/1991 | Brand ..................................... 73/651 |
| 5,381,692 | * | 1/1995 | Winslow et al. ...................... 73/593 |
| 5,433,531 | * | 7/1995 | Thompson ............................ 384/276 |
| 5,451,110 | * | 9/1995 | Gams, Jr. et al. .................... 384/624 |
| 5,599,112 | * | 2/1997 | Klein ..................................... 384/624 |
| 5,701,119 | * | 12/1997 | Jurrias ................................... 384/448 |

* cited by examiner

Primary Examiner—Lenard A. Footland

(57) ABSTRACT

The present invention provides bearing assemblies and methods of manufacturing bearing assemblies which allow for reliable, non-intrusive wear detection. In one embodiment, a bearing assembly (10) includes first and second bearing members (12, 14) adapted for movement relative to each other. The first bearing member includes an outer layer (24) that is adapted to wear in response to the relative movement between bearing members, and an inner layer. The inner layer includes a base portion (28) having a first hardness and a plurality of spaced apart wear indicating regions (30) having a second hardness, whereby the first hardness and second hardness are different. The wear indicating regions are adapted to produce a vibration after sufficient wear of the outer layer.

19 Claims, 2 Drawing Sheets

HIGH RELIABILITY BEARING STRUCTURE

BACKGROUND OF THE INVENTION

The present invention relates generally to bearing assemblies having wear indicators, and more specifically, to bearing assemblies with wear indicators having a different hardness than the surrounding bearing structure to produce detectible and identifiable vibrations.

A wide variety of bearing assemblies are available for use in a seemingly endless number and types of machines. Bearing assemblies typically include at least two components that move relative to each other. For example, assemblies may include components which rotate or slide relative to another component. Wear and tear on bearing components, even those lubricated to facilitate relative movement, can ultimately lead to bearing failure. To prevent such failure, often it is desirable to detect and replace worn bearing members and components before catastrophic failure thereof.

Detecting bearing wear and/or replacing worn bearing components have taken a number of forms. For example, bearing assemblies may be manually disassembled or replaced at a predicted lifetime. Unfortunately, bearings that wear faster than predicted can fail prior to a scheduled repair or replacement. Bearings that wear slower than predicted may be replaced before the end of their useful life. For some bearings, physical or visual inspection will suffice. Clearly, however, such inspections provide little assistance when the bearing to be evaluated is out of view or buried within surrounding equipment. Such inspections also may be time consuming or unnecessarily interrupt operation of the machine containing the bearing.

The measurement of vibrations may also be used to determine when maintenance is required on mechanical systems. However, vibration analysis is not always effective in providing a signal prior to catastrophic device failure because excessive wear can occur under conditions where detectible and identifiable vibrations do not arise.

SUMMARY OF THE INVENTION

The present invention provides bearing assemblies and methods of manufacturing bearing assemblies which allow for reliable, non-intrusive wear detection.

In one embodiment, the present invention provides a bearing assembly including first and second bearing members adapted for movement relative to each other. The first bearing member includes an outer layer that is adapted to wear in response to the relative movement between the first and second bearing members. The first bearing member further includes an inner layer in contact with the outer layer. The inner layer includes a base portion having a first hardness and a plurality of spaced apart wear indicating regions having a second hardness, whereby the first hardness and second hardness are different. The wear indicating regions are adapted to produce a vibration after sufficient wear of the outer layer.

The first hardness may be greater than or less than the second hardness. In this manner, wear of the outer layer results in the inner layer becoming exposed. Since the wear indicating regions have a different hardness than the inner layer base portion, the second bearing member is exposed to alternating regions having different hardness. As a result, continued relative movement produces a vibration.

In one aspect, the outer layer comprises a nitridized metal. In another aspect, the outer layer comprises a carbonized metal. In still another aspect, the first and second bearing members comprise a ceramic.

In one aspect of the bearing assembly, the first bearing member is stationary and the second bearing member is adapted to move relative to the first bearing member. Alternatively, the second bearing member is stationary and the first bearing member is adapted to move relative to the second bearing member. Further, both the first and second bearing members could move in a manner which produces relative movement therebetween.

In one particular aspect, the wear indicating regions are spaced apart from each other so that the regions produce a vibration having a desired frequency when the relative movement between the first and second bearing members occurs at a particular rate. In this manner, detection of the desired vibration frequency indicates that the wear indicating regions are exposed and, thus, subjected to wear.

In one aspect, the second bearing member comprises a movable bearing and the first bearing member comprises a bearing race. In another aspect, the first and second bearing members comprise an axial bearing. In still another aspect, the first and second bearing members comprise a linear slide bearing. Alternatively, first and second bearing members comprise a thrust bearing.

In one particular aspect, the outer layer has a thickness that is equal to between about 50 percent and about 100 percent of a wear limit of the first bearing member. In this manner, vibrations are produced by the wear indicating regions before catastrophic failure of the first bearing member occurs. In one aspect, the wear indicating regions include regions formed by ion implantation. Alternatively, the wear indicating regions include regions formed by chemical vapor deposition.

In one embodiment of the present invention, a bearing assembly comprises a housing adapted to support first and second bearing members. The first and second bearing members are adapted for movement relative to each other. The first bearing member includes an outer layer adapted to wear in response to the relative movement between the first and second bearing members. The first bearing member further includes an inner layer in contact with the outer layer. The inner layer includes a base portion having a first hardness and a plurality of spaced-apart wear indicating regions each having a second hardness, and wherein the first and second hardnesses are different. Wear indicating regions are further adapted to produce a vibration after sufficient wear of the outer layer.

In one aspect of the bearing assembly, a vibration detector is provided, operably attached to the housing. The detector is adapted to detect vibrations caused by the wear indicating regions.

The present invention further provides a method of manufacturing a bearing assembly. The method includes the steps of forming a base portion of a first bearing member inner layer. A plurality of spaced-apart wear indicating regions are created in the base portion. The wear indicating regions have a hardness that is different than a hardness of the base portion. The method includes forming an outer layer over the base portion. A second bearing member is provided that is adapted to provide relative movement between the first and second bearing members.

In one aspect of the method, the wear indicating regions are created using an ion implantation technique. In another aspect of the method, the base portion is formed having a plurality of spaced-apart cavities. The wear indicating regions are created by filling the cavities with a material that is different than a base portion material. In one aspect of the method, the cavities are filled using a chemical vapor deposition technique to produce the wear indicating regions.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
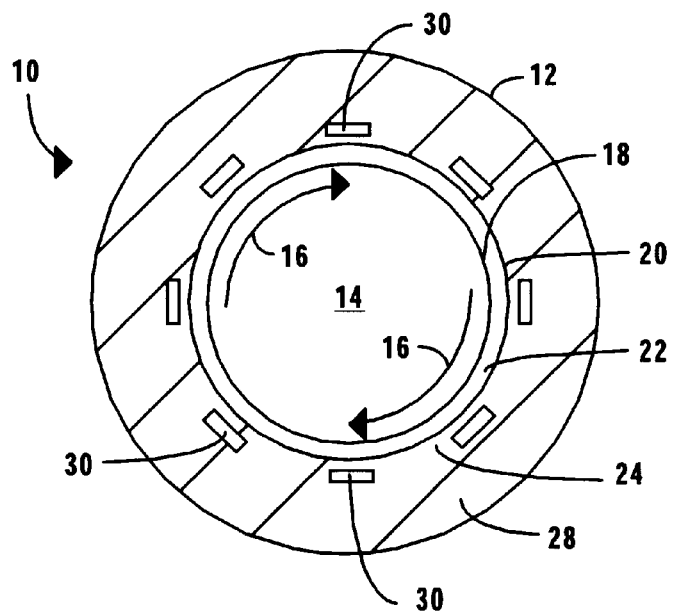
FIG. 1 depicts a partial cross-sectional front view of a bearing assembly according to the present invention having rotational relative movement between two bearing members.
Figure 2:
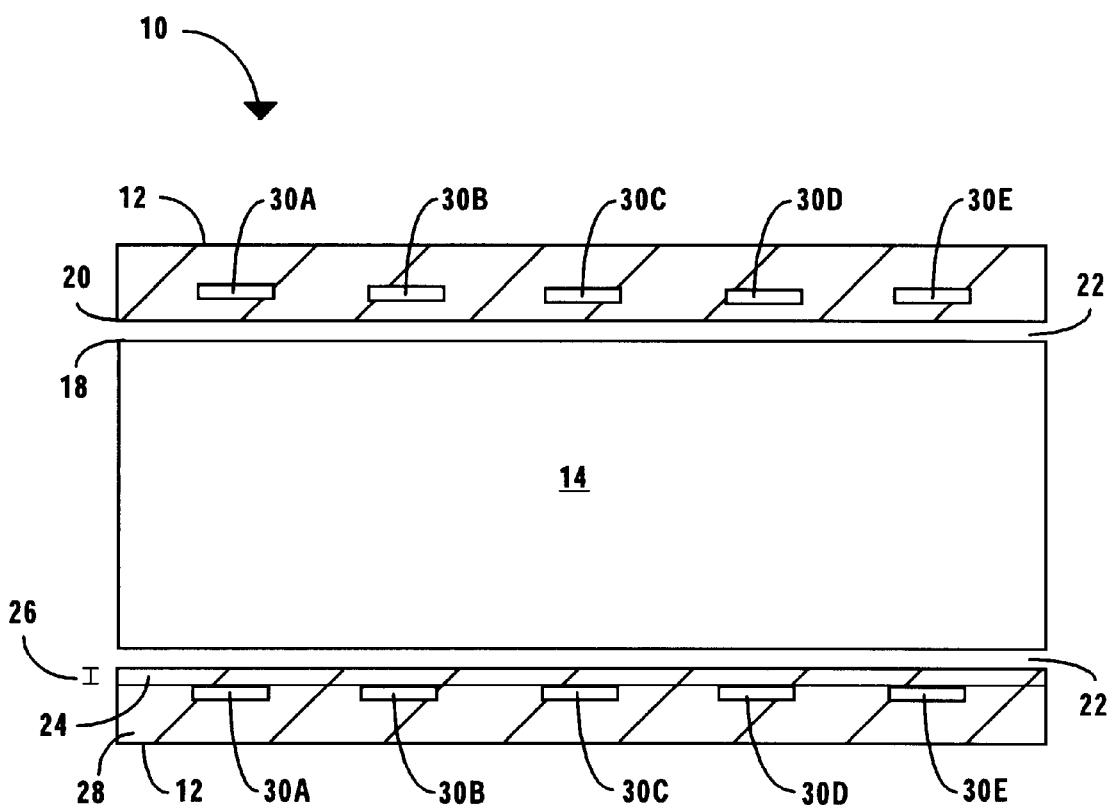
FIG. 2 depicts a partial cross-sectional side view of the bearing assembly depicted in FIG. 1.

FIG. 1 depicts a bearing assembly 10 according to the present invention. Bearing assembly 10 includes a first bearing member 12 and a second bearing member 14. Arrows 16 show relative movement of first and second bearing members 12 and 14 with respect to one another. As depicted in FIGS. 1 and 2, bearing members 12 and 14 have a rotational relative movement. As shown, second bearing member 14 is a solid shaft-like bearing. Alternatively, second bearing member 14 may be hollow. Second bearing member 14 has an outer surface 18 which moves relative to a first bearing member outer surface 20. As depicted in FIGS. 1 and 2, a gap 22 preferably exists between outer surfaces 18 and 20. Gap 22 may be filled with oil or other lubricants (not shown) to facilitate relative movement. Outer surfaces 18 and 20 also may be in contact with one another, thereby eliminating gap 22.

First bearing member 12 has a first bearing member outer layer 24 and a base portion 28. Outer layer 24 has an outer layer thickness 26 as best seen in FIG. 2. A plurality of wear indicating regions 30 are spaced apart within base portion 28. Together, base portion 28 and regions 30 comprise an inner layer of bearing member 12. As first and second bearing members 12 and 14 rotate relative to one another, first bearing member outer layer 24 may be worn away. Wear resulting from the predescribed relative movement likely eventually results in wear indicating regions 30 being exposed to second bearing member outer surface 18. As this occurs, wear indicating regions 30 cause a particular vibration as the exposed first and second bearing members 12 and 14 rotate relative to each other.

In particular, wear indicating regions 30 produce vibrations as a result of regions 30 having a different hardness than the remaining portions of first bearing member 12. For example, regions 30 may have a hardness that is greater than the hardness of base portion 28 and outer layer 24. Alternatively, wear regions 30 may have a hardness that is less than the hardness of base portion 28 and outer layer 24. In this manner, when wear indicating regions 30 are exposed to second bearing member 14 due to wear of outer layer 24, alternating comparatively hard and soft portions of base portion 28 and regions 30 may be exposed to outer surface 18 of second bearing member 14. The rotation of a bearing having exposed materials with different hardnesses causes the bearing to vibrate during rotation.

Wear indicating regions 30 are preferably spaced apart a known distance, and more preferably, are spaced part equal distances from one another. As a result, relative rotation of bearing members 12 and 14 at a known rate results in wear indicating regions 30 producing a vibration or noise at a known frequency. The vibrations caused by wear indicating regions 30 will be detectable by a vibration detection sensor (not shown) that may be attached to a housing (not shown) containing bearing members 12 and 14. Similarly, the detection sensor may be connected to one of bearing members 12 and 14, or the detection sensor may be placed in a location proximate the two bearing members.

Vibration detection sensors can be designed to identify regions of known frequencies based on the spacing of regions 30 and the relative rotation of bearing members 12 and 14. As a result, vibration detection sensors will detect when wear indicating regions 30 are exposed to second bearing member 14 due to the wear of outer layer 24. The detection of vibrations within rotating or oscillating bearings is readily accomplished using, for example, a piezoelectric sensor, which may articulate with any portion of bearing assembly 10. Such a sensor may comprise PZT, barium-strontium-titanate (BST) or the like.

FIG. 1 depicts eight wear indicating regions 30 spaced apart approximately 45 degrees around first bearing member 12. As it will be appreciated by those skilled in the art, the spacing and number of regions 30 may vary within the scope of the present invention. The ability to detect vibrations of known frequency, however, will of course depend in part upon the knowledge of the number and spacing of such regions 30. Thickness 26 of outer layer 24 also can vary within the scope of the present invention. In one aspect of the present invention, it is preferable to establish regions 30 at a desired wear limit of first bearing member 12. For example, regions 30 may be positioned at thickness 26 that is between about 50 percent and about 100 percent of the desired wear limit of first bearing 12. Alternatively, regions 30 may be positioned at more than one thickness 26. For example, a first series of regions 30 may be positioned at thickness 26 corresponding to about 50 percent of the desired wear of bearing member 12, and a second series of wear indicating regions 30 can be positioned at a second thickness 26 corresponding to about 100 percent of the desired wear of bearing member 12. In this manner, bearing assembly 10 would emit a desired frequency at approximately 50 percent of bearing member 12 wear, and a desired frequency, possibly a different frequency, at about 100 percent of the wear of bearing member 12. Again, as can be appreciated by those skilled in the art, the vibrations produced will, in part, depend upon the number and spacing of regions 30. Therefore, for use with more than one layer of regions 30 within base portion 28, it may be preferable to have each series of regions 30 have a different number and/or a different spacing of regions 30. In this manner, each series or layer of regions 30 would produce a different vibrational frequency for a given rate of relative movement.

FIG. 1 further reveals plurality of wear indicating regions 30 spaced in a single ring. As best shown in FIG. 2, in one aspect of the present invention, it is preferable to have a plurality of rings of wear indicating regions 30. For example, FIG. 2 depicts a first ring of regions 30A, a second ring of regions 30B, a third ring of regions 30C, a fourth ring of regions 30D, and a fifth ring of regions 30E. As can be appreciated, the number and spacing of rings of regions 30A–E can vary depending on the locations at which it is desirable to detect wear.

The construction of bearing assembly 10 depicted in FIGS. 1 and 2 will now be described. In accordance with a preferred embodiment of the invention, bearing assembly 10 is manufactured by forming base portion 28 of first bearing member 12. Next, a plurality of spaced-apart wear indicating regions 30 are created in base portion 28 and outer layer 24 is formed over base portion 28 and wear indicating regions 30. Finally, second bearing member 14 is provided and configured for relative movement between it and first bearing member 12.

Wear indicating regions 30 can be formed in base portion 28 by a number of different methods. For example, base portion 28 may be formed with a plurality of cavities having the desired shape, size and location of wear indicating regions 30. Such cavities may then be filled with a material that has a different hardness than the base portion 28 material. Such cavities may be filled, for example, using chemical vapor deposition. Machining may be required to form regions 30 to a preferred shape. Outer layer 24, which is formed over base portion 28 and regions 30, may comprise the same material as base portion 28. Alternatively, outer layer 24 may comprise material that is different than the base portion 28 material.

A second manner of manufacturing wear indicating regions 30 comprises forming base portion 28 and hardening the wear indicating regions 30 in base portion 28 using an ion implantation technique. Ion implantation would be targeted to the desired locations of wear indicating regions 30 to produce regions 30 having a hardness that is greater than the hardness of surrounding base portion 28 material. Where desirable, regions 30 may be machined down to the desired shape and size.

A variety of materials may be used to make bearing member 12 within the scope of the present invention. For example, bearing member 12, including base portion 28 and outer layer 24, may comprise brass. In such an embodiment, the implantation of tin ions into the desired locations of base portion 28 would create wear indicating regions 30. For bearing member 12 comprising a ceramic, wear indicating regions 30 may comprise a softer material, such as titanium, zinc, and the like. Other metallic layers composed of such alloys as tin-based or lead-based babbitts, copper lead alloys aluminum alloys, or the like, also may be used for bearing member 12 and wear indicating regions 30. Outer layer 24 of bearing members 12 and 14 also may comprise carbonized metal, nitridized metal or the like.

Figure 3:
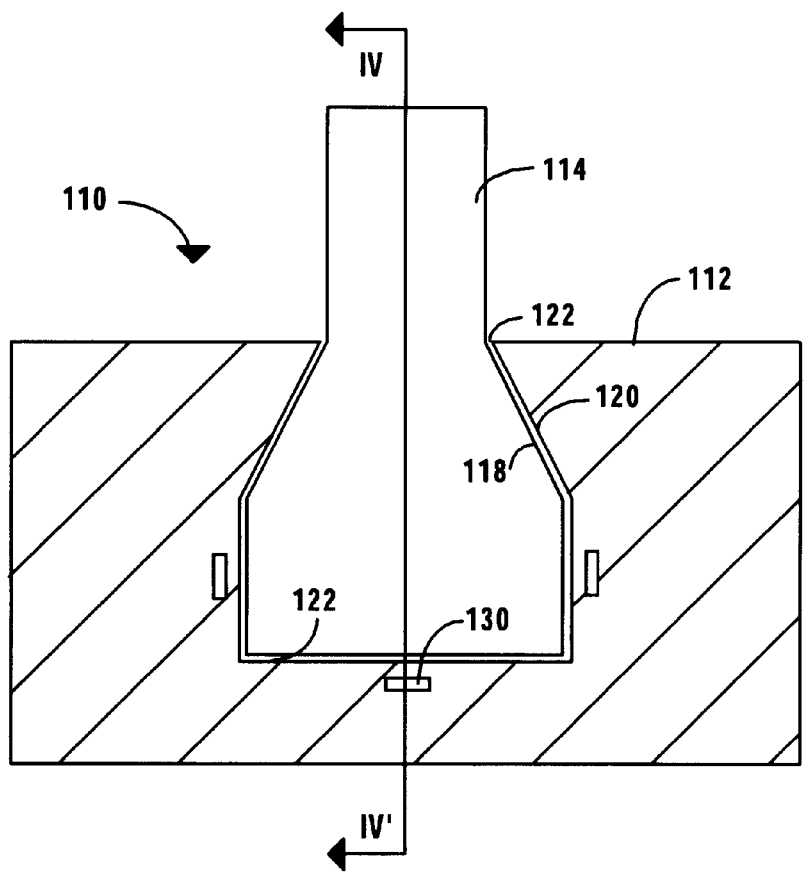
FIG. 3 depicts a partial cross-sectional front view of a bearing assembly according to the present invention having linear relative movement between two bearing members.
Figure 4:
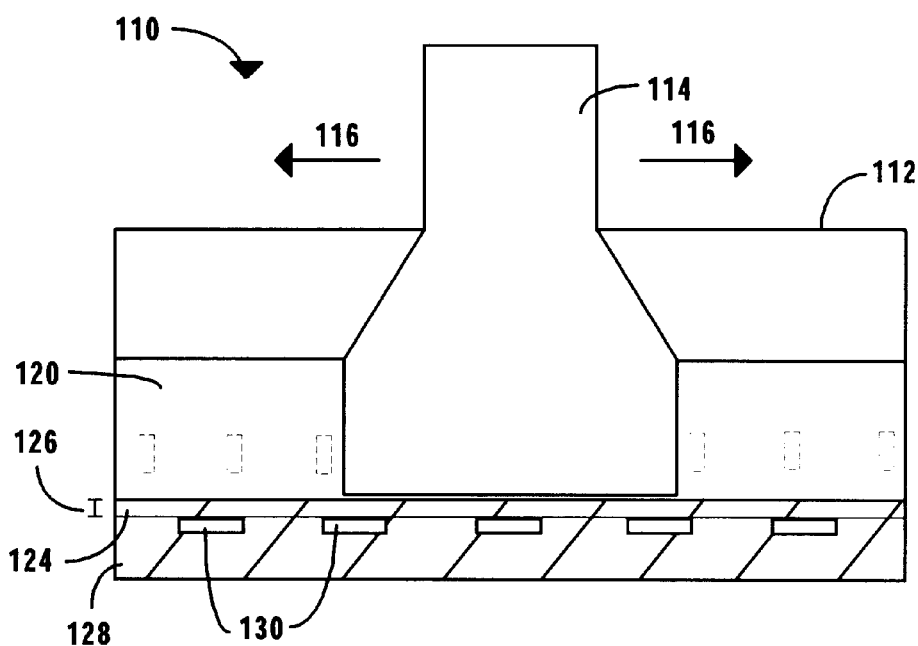
FIG. 4 depicts the bearing assembly shown in FIG. 3 taken along line 4—4.

Turning now to FIGS. 3 and 4, an alternative embodiment of the present invention will be described. FIGS. 3 and 4 depict a bearing assembly 110 having a first bearing member 112 and a second bearing member 114. First bearing member 112 has an outer surface 120 and second bearing member 114 has an outer surface 118. As depicted in FIGS. 3 and 4, bearing members 112 and 114 are adapted to have a linear relative movement with respect to each other. More specifically, arrows 116 in FIG. 4 show relative movement of first and second bearing members 112 and 114 with respect to one another. A gap 122 may exist between outer surfaces 118 and 120. In one aspect, gap 122 is filled with lubricant, such as oil or the like (not shown). Alternatively, outer surfaces 118 and 120 may be in contact with each other, thereby eliminating gap 122.

The principles of bearing assembly 110 are essentially the same as those of bearing assembly 10 described in conjunction with FIGS. 1 and 2. Namely, first bearing 112 has an outer layer 124 having a thickness 126. First bearing 112 further includes a base portion 128 having a plurality of spaced-apart wear indicating regions 130. As first and second bearing members 112 and 114 move relative to one another, as shown by arrows 116, outer layer 124 may be worn away. The wear of outer layer 124 may eventually result in wear indicating regions 130 being exposed to outer surface 118 of second bearing member 114. Regions 130 preferably have a hardness that is different than a hardness of base portion 128. Therefore, the relative movement between bearing members 112 and 114 results in outer surface 118 passing over base portion 128 and regions 130 having alternating hardnesses. Such movement over regions 130 and base portion 128 will produce a vibration having known characteristics depending, in part, on the rate of relative movement and the spacing of regions 130. As best shown in FIG. 3, wear indicating regions 130 may be positioned in more than one portion of bearing member 112. For example, wear indicating regions 130 may be positioned along the sides of bearing member 114 and below bearing 114.

While the invention has been shown and described in accordance with particular bearing configurations, namely a rotational bearing depicted in FIGS. 1 and 2 and a linear bearing depicted in FIGS. 3 and 4, those skilled in the art will appreciate that the present invention can be used with a wide range of bearing types having components that move relative to one another. Further, while the bearing assemblies 10 and 110 have been described with a single bearing member containing wear indicating regions, the present invention anticipates both bearing members having wear indicating regions. For example, both first and second bearing members 112 and 114 in FIGS. 3 and 4 can have regions 130 located below outer surfaces 118 and 120 of bearing members 112 and 114, respectively. Further, regions 130 within bearing member 112 can have a different hardness and/or spacing than regions 130 within bearing member 114. This would result in the production of two different vibration frequencies and allow the vibration detector to determine which bearing member 112, 114 was worn.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A bearing assembly comprising:

first and second bearing members adapted for movement relative to each other;

said first bearing member comprising, an outer layer adapted to wear in response to said relative movement between said first and said second bearing members; and an inner layer in contact with said outer layer, said inner layer comprising a base portion having a first hardness and a plurality of spaced apart wear indicating regions each having a second hardness, said first hardness being different than said second hardness; and wherein said wear indicating regions are adapted to produce a vibration during movement of said first and second bearing members relative to each other after sufficient wear of said outer layer which at least partially exposes said wear indicating regions.

2. A bearing assembly as in claim 1, wherein said first hardness is greater than said second hardness.

3. A bearing assembly as in claim 1, wherein said second hardness is greater than said first hardness.

4. A bearing assembly as in claim 1, wherein said outer layer comprises a nitridized metal.

5. A bearing assembly as in claim 1, wherein said outer layer comprises a carbonized metal.

6. A bearing assembly as in claim 1, wherein said first and said second bearing members comprise a ceramic.

7. A bearing assembly as in claim 1, wherein said first bearing member is stationary and said second bearing member is adapted to move relative to said first bearing member.

8. A bearing assembly as in claim 1, wherein said second bearing member is stationary and said first bearing member is adapted to move relative to said second bearing member.

9. A bearing assembly as in claim 1, wherein said wear indicating regions are spaced apart so that said regions produce a vibration having a desired frequency when said relative movement between said first and said second bearing members occurs at a known rate.

10. A bearing assembly as in claim 1, wherein said second bearing member comprises a movable bearing and said first bearing member comprises a bearing race.

11. A bearing assembly as in claim 1, wherein said wear indicating regions comprise regions formed by chemical vapor deposition.

12. A bearing assembly as in claim 1, wherein said wear indicating regions comprise regions formed by ion implantation.

13. A bearing assembly as in claim 1, wherein said first and said second bearing members comprise a thrust bearing.

14. A bearing assembly as in claim 1, wherein said outer layer has a thickness that is equal to between about 50 percent and about 100 percent of a wear limit of said first member.

15. A bearing assembly comprising:
- a housing adapted to support first and second bearing members, said first and said second bearing members being adapted for movement relative to each other;
- said first bearing member comprising,
  - an outer layer adapted to wear in response to said relative movement between said first and said second bearing members; and
  - an inner layer in contact with said outer layer, said inner layer comprising a base portion having a first hardness and a plurality of spaced apart wear indicating regions each having a second hardness, said first hardness being different than said second hardness; and
- wherein said wear indicating regions are adapted to produce a vibration during movement of said first and second bearing members relative to each other after sufficient wear of said outer layer which at least partially exposes said wear indicating regions.

16. A bearing assembly comprising:
- a housing adapted to support first and second bearing members, said first and said second bearing members being adapted for movement relative to each other;
- said first bearing member comprising,
  - an outer layer adapted to wear in response to said relative movement between said first and said second bearing members; and
  - an inner layer in contact with said outer layer, said inner layer comprising a base portion having a first hardness and a plurality of spaced apart wear indicating regions each having a second hardness, said first hardness being different than said second hardness;
- wherein said wear indicating regions are adapted to produce a vibration after sufficient wear of said outer layer; and
- a vibration detector operably attached to said housing, said detector being adapted to detect vibrations caused by said wear indicating regions.

17. The bearing assembly as in claim 16, wherein said first and said second bearing members are adapted for linear movement relative to each other.

18. The bearing assembly as in claim 16, wherein said first and said second bearing members are adapted for rotational movement relative to each other.

19. The bearing assembly as in claim 16, wherein said wear indicating regions are spaced apart so that said regions produce a vibration having a desired frequency when said relative movement between said first and said second bearing members occurs at a known rate.

* * * * *